US006765701B2

(12) United States Patent
Yang et al.

(10) Patent No.: US 6,765,701 B2
(45) Date of Patent: Jul. 20, 2004

(54) FILM SCANNER WITH UNIFORMIZED INFRARED LIGHT BY UTILIZING A COLD CATHODE FLUORESCENT LAMP

(75) Inventors: Jin-Wen Yang, Pan-Chiao (TW); Sheng-Kao Chen, Hsin-Chu (TW); Chih-Po Yang, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 184 days.

(21) Appl. No.: 09/683,644

(22) Filed: Jan. 29, 2002

(65) Prior Publication Data

US 2002/0109866 A1 Aug. 15, 2002

(30) Foreign Application Priority Data

Feb. 15, 2001 (TW) ....................................... 90103478 A

(51) Int. Cl.[7] ........................... H04N 1/04; H01L 27/00; H01J 40/14; G01J 5/00

(52) U.S. Cl. ....................... 358/487; 358/475; 358/485; 250/208.1; 250/235; 250/338.1

(58) Field of Search ................................ 358/487, 475, 358/485; 250/208.1, 235, 338.1

(56) References Cited

U.S. PATENT DOCUMENTS

| | | | | | |
|---|---|---|---|---|---|
| 5,140,221 | A | * | 8/1992 | Ichinose | 313/581 |
| 5,923,042 | A | * | 7/1999 | Mietta et al. | 250/559.06 |
| 5,969,372 | A | * | 10/1999 | Stavely et al. | 250/559.42 |
| 6,380,539 | B1 | * | 4/2002 | Edgar | 250/339.05 |
| 6,493,061 | B1 | * | 12/2002 | Arita et al. | 355/41 |
| 6,498,867 | B1 | * | 12/2002 | Potucek et al. | 382/274 |

* cited by examiner

*Primary Examiner*—Edward Coles
*Assistant Examiner*—Houshang Safaipour
(74) *Attorney, Agent, or Firm*—Winston Hsu

(57) ABSTRACT

A film scanner includes a cold cathode lamp for producing visible light to scan a film containing a plurality of photographic images, an infrared source for producing infrared light to scan the film, and a detector or light sensor for sensing the visible light. The infrared light transmits the film to produce corresponding image signals. The cold cathode lamp is disposed between the infrared source and the film and the cold cathode lamp is in contact with the infrared source. In this way, before arriving at the film the infrared light is substantially uniformized by passing through the cold cathode lamp.

20 Claims, 3 Drawing Sheets

30
36
34
46
L
IR
32
40
38
42
36a
51
52

FILM SCANNER WITH UNIFORMIZED INFRARED LIGHT BY UTILIZING A COLD CATHODE FLUORESCENT LAMP

BACKGROUND OF INVENTION

1. Field of the Invention

The present invention relates to the field of an image scanning system, and more particularly, to a film scanner equipped with a cold cathode fluorescent lamp (CCFL) that can produce visible light and uniformize infrared light generated by an infrared source.

2. Description of the Prior Art

In a typical image scanner, light from an image is focused onto linear arrays of photo-sensors for scanning one line at a time. A two dimensional image is scanned by providing relative movement between the linear sensor arrays and the original image. In general, a color scanner measures the intensity of at least three relatively narrow bands of wavelengths of visible light, for example, bands of red, green and blue. A color scanner may sequentially present multiple bands of wavelengths to a single row of sensor elements by sequentially activating different colored light sources.

A typical film scanner developed by Nikon uses three color LEDs to illuminate the film. The LEDs have well-controlled light characteristics, and are not subject to the fading of conventional color filter materials. The LED light source is also somewhat collimated (the light waves travel in relatively straight lines), which produces very sharp scans, but also has a tendency to emphasize scratches, dust, and film defects.

Please refer to FIG. 1. FIG. 1 is a schematic diagram of a prior film scanner 10 equipped with LED light sources. A film scanner 10 is used to scan a film or negative 11. The film scanner 10 comprises four LEDs 12*a*, 12*b*, 12*c* and 12*d*, a ground glass 14, a diffuser 16, a projection lens 18, and a detector or light sensor 20. The LEDs 12*a*, 12*b*, or 12*c* can produce red light, green light, or blue light respectively, and the LED 12*d* produces infrared light. The ground glass 14 and the diffuser 16 are used to generate uniform and parallel scanning light. When scanning, the film scanner 10 performs scans by visible light that is generated by the LEDs 12*a*, 12*b*, and 12*c*. Then, the film scanner 10 performs scans by infrared light emitted from the LED 12*d*. Since the infrared light cannot pass through particles of dust or scratches on the film 11, the images of the film 11 can be restored.

When scanning the film 11 by the prior art film scanner 10 as described above, the ground glass 14 and diffuser 16 are both essential since uniform and parallel infrared light is required. This leads to a more complicated assembly and therefore a more costly design of the film scanner 10.

SUMMARY OF INVENTION

It is therefore a primary objective of the claimed invention to provide a new film scanner design that utilizes a cold cathode fluorescent lamp (CCFL) for providing visible light and uniformizing infrared light.

It is another objective of the claimed invention to provide a more cost-effective film scanner by replacing the ground glass and the diffuser of a prior art film scanner with a cold cathode lamp.

In accordance with the objectives of the claimed invention, the claimed invention provides a film scanner comprising a cold cathode fluorescent lamp for producing visible light to scan a film containing a plurality of photographic images therein, an infrared source for producing infrared light to scan the film, and a detector for sensing the visible light and the infrared light transmitting the film to produce corresponding image signals. The cold cathode fluorescent lamp is disposed between the infrared source and the film and the cold cathode fluorescent lamp is in contact with the infrared source. In this way, before arriving at the film the infrared light is substantially uniformized by passing through the cold cathode fluorescent lamp.

It is an advantage of the claimed invention that the film scanner is not complicated. Further, the film scanner according to the claimed invention saves a lot of space.

It is another advantage of the claimed invention that the film scanner according to the claimed invention is very cost-effective since both a ground glass and a diffuser are eliminated.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
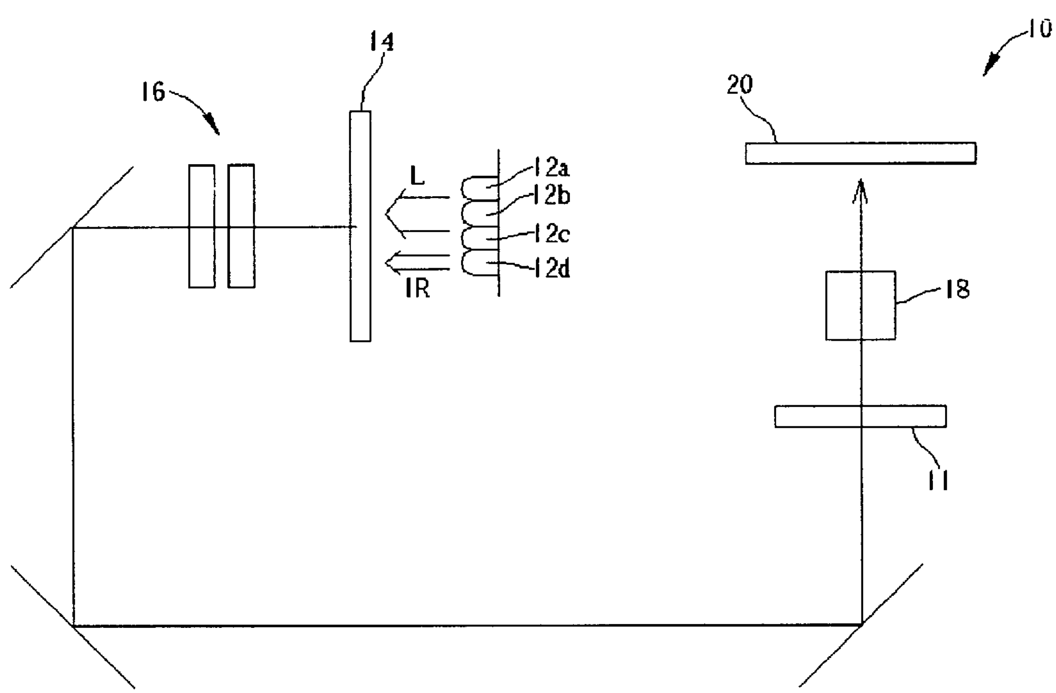
FIG. 1 is a schematic diagram of a prior art film scanner.
Figure 2:
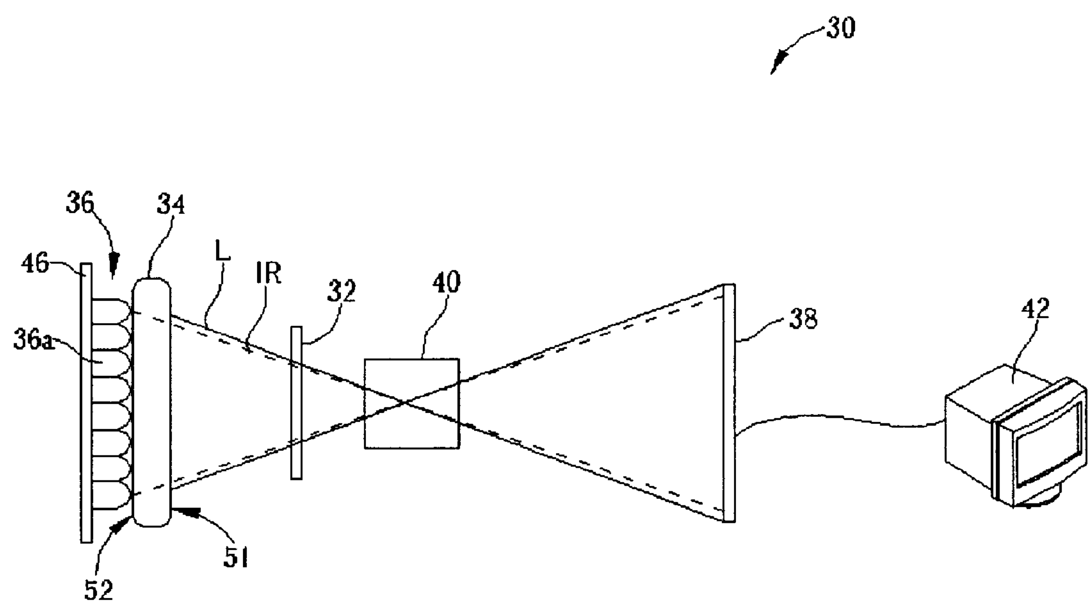
FIG. 2 is a schematic diagram of a film scanner according to the present invention.

Please refer to FIG. 2. FIG. 2 is a schematic diagram illustrating a film scanner 30 according to the present invention. The film scanner 30 is used to scan a film or negative 32 containing a plurality of photographic images therein. The film scanner 30 comprises a column of cold cathode lamp 34 such as a fluorescent lamp, a linear array of LED infrared source 36, a light sensor 38, and an optic projection module 40. The LED infrared source 36 is fabricated on a printed circuit board (PCB) 46. The light sensor 38 is used to detect the visible light and the infrared light transmitting from the film 32. Corresponding image signals detected by the light sensor 38 are stored and processed by a computer 42 having a processor (or CPU) and a memory, which is electrically connected to the light sensor 38. The optic projection module 40, having a projection lens therein, is disposed between the film 32 and the light sensor 38.

The cold cathode lamp 34 may be a low-pressure mercury vapor lamp or other commercial fluorescent lamps. These lamps typically use the 253 nm ultraviolet (UV) emissions from mercury vapor excited by electrical discharge through the lamp to cause strong fluorescence in phosphors on the wall of the lamp. A suitable cold cathode lamp 34 is a linear cold cathode lamp that provides visible light. Typical applications for these visible cold cathode lamps include backlighting for LCD screens, and scanners or barcode readers.

According to one preferred embodiment of the present invention, the cold cathode lamp 34 is disposed between the infrared source 36 and the film 32. The cold cathode lamp 34 has a front side 51 facing the film 32 and a backside 52. The linear array of infrared source 36 comprises a plurality of IR light emitting diodes (LEDs) 36*a* in contact with the backside 52 of the cold cathode lamp 34. More specifically, the IR LEDs 36*a* are aligned in parallel with the cold cathode lamp 34 at the backside 52. An exact number and diameter of the plurality of IR LEDs 36*a* generally depend on the length of the cold cathode lamp 34 and the size of the film scanner 30. The light sensor 38, which transforms the visible light and the infrared light that comprises film image signals into corresponding analog image signals, may be a charge-coupled device (CCD).

When scanning the film 32, two scanning steps are sequentially performed. During the first scanning step, the cold cathode lamp 34 is turned on while leaving the IR LEDs 36 turned off. The visible light generated by the cold cathode lamp 34 arrives at the film 32 without passing through any ground glass or diffuser. The visible light goes on to penetrate the film 32 and then the optic projection module 40 to the light sensor 38. A first image signal data is collected by the sensor 38 after scanning the entire film 32 by the visible light and stored in the memory of the computer 42.

During the second scanning step, the infrared source 36 is turned on while the cold cathode lamp 34 is turned off. Likewise, the infrared (IR) light (demonstrated in FIG. 2 as dashed line) generated by the infrared source 36 arrives at the sensor 38 through the film 32 and the projection module 40. Second image signal data, comprising images affected by the scrapes or particles of dust on the film 32, is detected by the sensor 38 and stored in the memory of the computer 42. After finishing the two-step scanning process, an image process step is then performed with the computer 42 by comparing the second image signal data with the first image signal data. The resultant image will be an improved image eliminating the imperfections of the film 32 caused by the scratches or particles of dust.

Since the cold cathode lamp 34 has an opaque surface, the infrared light, which is generated by the IR source 36, is uniformized by the cold cathode lamp 34 without the aid of a ground glass. The phosphor materials coated in the inner wall of the lamp 34 help to produce a uniform IR light. In addition, the architecture of the cold cathode lamp 34 combined with a plurality of aligned IR LEDs 36*a* at the backside 52 of the cold cathode lamp 34 allows the film scanner 30 of the present invention to omit a diffuser.

Figure 3:
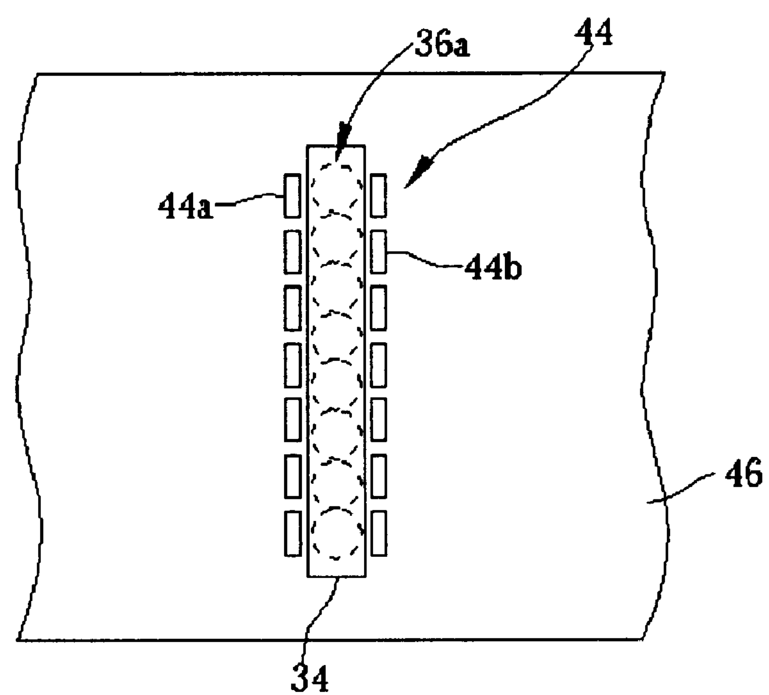
FIG. 3 is a plan view of the printed circuit board of FIG. 2.

Please refer to FIG. 3. FIG. 3 is a plan view of a printed circuit board 46 as shown in FIG. 2. As mentioned, the plurality of aligned LEDs 36*a* is disposed on the printed circuit board 46. The film scanner 30 may further comprise a preheating device 44 disposed adjacent to the cold cathode lamp 34 on the printed circuit board 46. The preheating device 44 may be composed of preheating resistors 44*a* and 44*b* soldered next to the infrared source 36 for preheating the lamp 34. The preheating device 44 enables the cold cathode lamp 34 to rapidly achieve an optimal operation temperature during scanning iteration and thus improve the throughput.

In another embodiment of the present invention, the film scanner 30 optionally comprise an anti-reflection plate (not shown in figures) to prevent the reflection rays mainly caused by the solder on the PCB 46 from affecting signal-to-noise (S/N) ratio of the light sensor 38.

In contrast to the prior art film scanner, the film scanner 30 according to the present is simpler, more space saving, and more cost-effective.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A film scanner comprising:

a cold cathode lamp for producing visible light to scan a film containing a plurality of photographic images therein, wherein the cold cathode fluorescent lamp comprises a front side facing the film and a back side opposite to the front side;

a plurality of infrared sources only disposed at the back side of the cold cathode fluorescent lamp and being away from the front side of the cold cathode fluorescent lamp for producing infrared light to scan the film, wherein the cathode lamp is disposed completely between the infrared sources and the film; and a detector for sensing the visible light and the infrared light transmitting the film to produce corresponding image signals;

wherein before arriving at the film the infrared light is substantially uniformized by passing through the cold cathode lamp.

2. The film scanner of claim 1 wherein a first image signal and a second image signal are sequentially detected by the detector after scanning the film, separately, by the visible light and the infrared light, and an image processing will be implemented by a computer electrically connected with the detector by comparing the second image signal with the first image signal.

3. The film scanner of claim 1 wherein the cold cathode lamp is in contact with the plurality of infrared sources.

4. The film scanner of claim 1 further comprising a printed circuit board on which the infrared sources are disposed.

5. The film scanner of claim 1 further comprising a preheating device disposed adjacent to the cold cathode lamp for preheating the cold cathode fluorescent lamp.

6. The film scanner of claim 5 wherein the preheating device comprises a plurality of preheating resistors disposed next to the infrared sources.

7. The film scanner of claim 1 further comprising a projection lens disposed between the film and the detector for the projection of the infrared light and the visible light to the detector.

8. A film scanner for scanning a film containing a plurality of photographic images therein, the film scanner comprising:

a column of cold cathode fluorescent lamp (CCFL) for producing visible light to scan the film, wherein the cold cathode fluorescent lamp comprises a front side facing the film and a back side;

a plurality of infrared sources only disposed at the back side of the cold cathode fluorescent lamp in a linear arrangement parallel to the column of cold cathode fluorescent lamp and being away from the front side of the cold cathode fluorescent lamp for producing infrared light to scan the film; and a detector for sensing the visible light and the infrared light transmitting the film to produce corresponding image signals;

wherein when the cold cathode fluorescent lamp is turned on, the visible light arrives at the detector by passing through the film and forms a first image signal, and when the cold cathode fluorescent lamp is turned off and the infrared sources are turned on, the infrared light arrives at the detector by passing through the cold cathode fluorescent lamp and then the film to generate a second image signal, an output image signal is generated by comparing the first image signal with the second image signal.

9. The film scanner of claim 8 wherein the detector is electrically connected to a computer.

10. The film scanner of claim 8 wherein the cold cathode fluorescent lamp is disposed between the infrared sources and the film.

11. The film scanner of claim 10 wherein the cold cathode fluorescent lamp is in contact with the infrared sources.

12. The film scanner of claim 8 further comprising a preheating device disposed adjacent to the cold cathode fluorescent lamp for preheating the cold cathode fluorescent lamp.

13. The film scanner of claim 12 wherein the preheating device comprises a plurality of preheating resistors disposed next to the infrared sources.

14. The film scanner of claim 8 further comprising a projection lens disposed between the film and the detector for the projection of the infrared light and the visible light to the detector.

15. A film scanner comprising:

a cold cathode lamp for producing visible light to scan a film containing a plurality of photographic images therein;

an infrared source for producing infrared light to scan the film, the infrared source being disposed in a linear arrangement parallel to the cold cathode lamp and having a length approximately equal to the length of the cold cathode lamp, wherein the cathode lamp is disposed completely between the infrared source and the film; and a detector for sensing the visible light and the infrared light transmitting the film to produce corresponding image signals;

wherein all infrared light emitted from the infrared source that arrives at the film after passing through the cold cathode lamp is substantially uniformized by passing through the cold cathode lamp.

16. The film scanner of claim 15 wherein the infrared source comprises a plurality of infrared lamps disposed in a linear arrangement parallel to the cold cathode lamp, a length of the linear arrangement of infrared lamps being approximately equal to the length of the cold cathode lamp.

17. The film scanner of claim 15 wherein the cold cathode lamp has an opaque surface for uniformizing the infrared light passing through the cold cathode lamp.

18. A film scanner for scanning a film containing a plurality of photographic images therein, the film scanner comprising:

a column of cold cathode fluorescent lamp (CCFL) for producing visible light to scan the film, wherein the cold cathode fluorescent lamp comprises a front side facing the film and a back side;

an infrared source disposed at the back side of the cold cathode fluorescent lamp in a linear arrangement parallel to the column of cold cathode fluorescent lamp for producing infrared light to scan the film, the infrared source having a length approximately equal to the length of the cold cathode lamp; and a detector for sensing the visible light and the infrared light transmitting the film to produce corresponding image signal;

wherein when the cold cathode fluorescent lamp is turned on, the visible light arrives at the detector by passing through the film and forms a first image signal, and when the cold cathode fluorescent lamp is turned off and the infrared source is turned on, the infrared light arrives at the detector by passing through the cold cathode fluorescent lamp and then the film to generate a second image signal, an output image signal is generated by comparing the first image signal with the second image signal.

19. The film scanner of claim 18 wherein the infrared source comprises a plurality of infrared lamps disposed in a linear arrangement parallel to the cold cathode lamp, a length of the linear arrangement of infrared lamps being approximately equal to the length of the cold cathode lamp.

20. The film scanner of claim 18 wherein the cold cathode lamp has an opaque surface for uniformizing the infrared light passing through the cold cathode lamp.

* * * * *